April 18, 1950 — M. L. CLOPTON — 2,504,108
DUAL IMAGE DRIFTMETER
Filed July 3, 1947
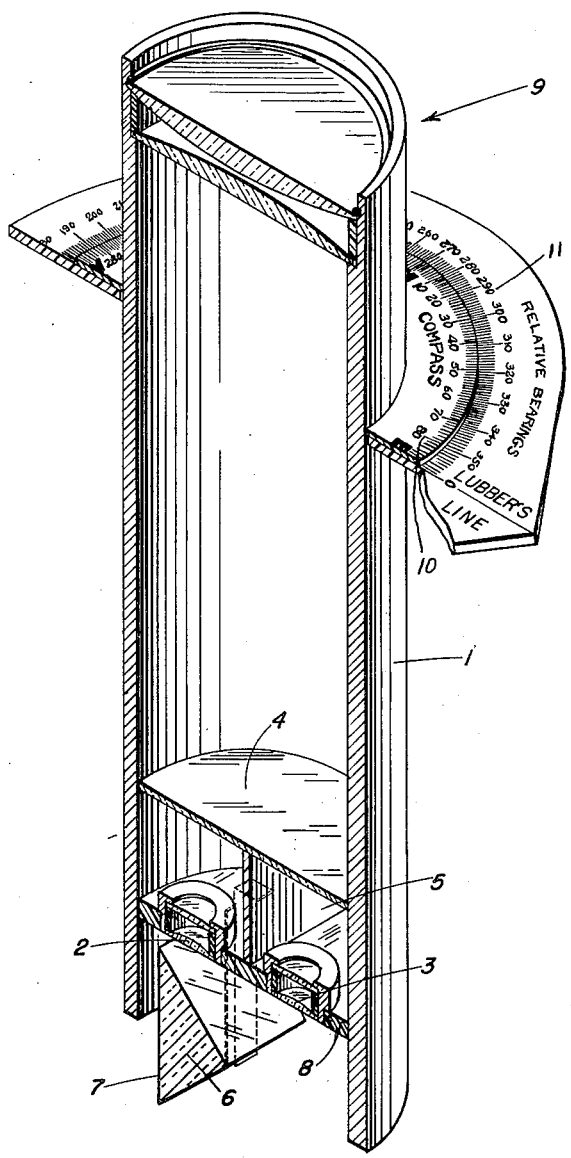
Inventor
Mortimer L. Clopton

UNITED STATES PATENT OFFICE 2,504,108

DUAL IMAGE DRIFT METER

Mortimer L. Clopton, Los Angeles, Calif.

Application July 3, 1947, Serial No. 758,971

7 Claims. (Cl. 88—1)

(Granted under the act of March 3, 1883, as amended April 30, 1928; 370 O. G. 757)

This invention relates to drift angle indicators or meters for aircraft, and more particularly to such indicators which project the image of the ground directly on half of a screen, and laterally inverted on the other half, whereby when the projecting means is turned off the line of travel the movements of the images on the two halves of the screen will not be parallel to each other but will diverge or converge relatively to each other to a greater extent for any misalignment of the projecting means with the direction of travel than just a direct image would diverge from a reference line on the screen, as in previous drift meters. Thus, in the present device, any slight misalignment may be more readily detected, and a more accurate alignment may be made, whereby the drift angle may be more accurately determined.

The object of this invention is to improve the accuracy of optical driftmeters by introducing a laterally reversed image on half of the screen to double the divergence between the movements of the direct image on one half of the screen and the inverted image on the other half, when the instrument is not lined up with the direction of travel, as compared to the actual misalignment of the instrument from the direction of travel.

Another object is to obtain the laterally reversed image by means of a reflecting triangular prism introduced in the projecting means for one half of the screen.

Another object is to mount the projecting means and screen in an axially rotatable vertical tube having a flange thereon with a compass scale inscribed around its edge cooperating with an adjacent circumferential "relative bearings" scale including a "lubber's line" at its origin, lined up with the heading of the craft in which it is mounted.

Other and more specific objects will become apparent in the following detailed description of a preferred form of device constructed in accordance with the present invention, having reference to the accompanying drawing, in which the single figure illustrates the device in a sectional perspective view.

The device is adaptable for mounting on any suitably located horizontal surface in an aircraft, in which a circular opening may be made of sufficient size to permit insertion of the tubular casing 1, and where the view below said opening to the ground will be unobstructed.

The tubular casing, or barrel 1 contains the projecting means or matching lenses 2 and 3 for the two halves of the screen or ground glass 4, a partition or baffle plate 5 being provided to separate the images. A reflecting prism 6 is mounted in front of the projecting means 2 in order to reverse the image on the corresponding half of the screen in a lateral direction relative to the partition between the two projecting means. The reflecting prism 6 obviously has its reflecting surface 7 parallel to the partition 5 for this purpose, and may be mounted on the lens board 8 in which the matching lenses are mounted. A plain reflecting mirror may be used in place of the prism 6, in which case it would be slightly tilted inwardly to throw the image into the lens 2. The screen 4 may be a ground glass or other translucent material of fine grain for good image definition.

A magnifying lens 9 may be inserted in the upper end of barrel 1. The barrel has a flange or inner ring 10 integral therewith and inscribed with a compass scale of 360° with the reference N at its origin, as shown, in line with the partition 5 and parallel to the reflecting surface 7. An outer ring 11 is rotatably mounted on barrel 1 and has a lubber's line and a relative bearings scale of 360° inscribed thereon, said lubber's line being at the origin of said scale. This outer ring is fixed properly, with the lubber's line parallel to the fore and aft axis of the aircraft, when mounting the instrument.

Thus the optical system described has the following characteristics:

(a) Two images, a primary and a secondary image, are viewed in immediate conjunction with each other.

(b) The secondary image is reversed laterally with respect to the partition, by means of a reflecting surface such as a mirror or a prism.

(c) When the optical system is rotated about its own axis, the primary image frame appears to revolve about the primary image in the same direction as and at the same rate of rotation as the optical system, whereas the secondary image appears to rotate within its frame in the same direction as and at double the rate of rotation of the optical system while its frame revolves with the frame of the primary image at the same rate as the optical system.

When the surface over which the aircraft is flying is viewed through this instrument, the surface appears to flow beneath the aircraft. The direction of the apparent flow of the primary image remains unchanged as the optical system is rotated, but the direction of apparent flow of the secondary image alters two degrees for every degree of rotation of the optical system.

When the reflecting surface of the optical system is parallel to the track of the aircraft, the apparent flow of the primary and secondary images is in the same direction and parallel. When the reflecting surface is perpendicular to the track, the apparent flow of the two images is in opposite directions normal to the partition between them. When the optical system is turned so that the reflecting surface is in any other position, the two images will appear to converge or diverge angularly in "herring bone" fashion. This effect is very conspicuous when the reflecting surface is moved out of parallelism with the track by the slightest amount, and consequently it can be told at a glance whether the origin N on the compass scale is lined up exactly with the track of the aircraft. This enables a quick and accurate adjustment of the optical system with respect to the track, and the relative bearings scale may then be read, opposite the index N on the compass scale, to give the bearing of the track relative to the heading of the aircraft. Obviously, care should be taken to see that N points in the direction of the track rather than 180° therefrom in the reverse direction, in order to get the proper reading.

To obtain the value of the drift angle right or left of the heading, the above reading is taken directly for right, and is subtracted from 360° for left.

To obtain the bearing of the track relative to the compass north, i. e. the compass bearing of the track, the compass scale is turned so that the lubber's line registers with the compass reading or compass course on the compass scale. The compass bearing of the track is then read on the compass scale opposite the relative bearings reading obtained above.

The use of magnifying lens 9 obviates the necessity of using a hood to keep extraneous light from the top surface of the screen 4.

In order to protect the prism from damage, misalignment, dust, dirt and spray, it may be mounted inwardly of the lens board 8. The prism, when so mounted, affects the focal length of the secondary lens 2 by shortening it. This effect may very easily be compensated for by setting this lens closer to the ground glass, or by using a secondary lens of slightly longer focal length than that of the primary lens 3, so that the two lenses may be set the same distance from the screen 4.

Other obvious modifications in form, relative dimensions and arrangement of parts to suit different conditions and uses of the device may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. In a drift meter for an aircraft, a tubular casing, means for rotatably mounting said casing on a vertical axis of the aircraft, a screen mounted in said casing, means in said casing for projecting an image of the ground directly on one half of said screen, means including a reflector for projecting another image of the ground on the other half of said screen so as to cause said other image to be laterally reversed with respect to the first image, and means cooperating with said casing for indicating the relative angle between said casing and a fixed line on the aircraft.

2. In a drift meter for an aircraft, a tubular casing, means for rotatably mounting said casing on a vertical axis of the aircraft, a screen mounted in said casing, means in said casing for projecting an image of the ground directly on one half of said screen, means in said casing comprising a prism for projecting another image of the ground on the other half of said screen in laterally reversed position with respect to the first image, and means for indicating the angular adjustment of said casing necessary to render the apparent flow of the reversed image parallel to and in the same direction as the apparent flow of the direct image.

3. The combination according to claim 2, wherein the last mentioned projecting means further comprises a direct image producing element and said prism is mounted between said element and said screen.

4. The combination according to claim 2, wherein the last mentioned projecting means further comprises a direct image producing element and said prism is mounted below said element, and said element and the first mentioned projecting means are mounted at the same distance from said screen and have the same focal distance.

5. A drift meter for an aircraft, comprising: an optical system including a screen, means for projecting a first image of the ground directly on one half of said screen, and means including a reflector for projecting a second image of the ground on the other half of said screen in laterally reversed relationship with respect to said first image; an inner ring mounted on said system having an angle scale thereon with its origin radially aligned with the center line of said screen; and means for rotatably mounting said system on a vertical axis of the aircraft, said mounting means comprising a stationary outer ring having a lubber's line inscribed thereon and cooperating with said inner ring for indicating the drift of the aircraft.

6. A drift meter according to claim 5, wherein said outer ring has a relative bearings scale inscribed thereon with its origin at the lubber's line.

7. A drift meter for an aircraft comprising a tubular casing, means for rotatably mounting said casing on a vertical axis of the aircraft, a screen in said casing, means in said casing for projecting a first image of the ground directly on one half of said screen, means including a reflector for projecting a second image of the ground on the other half of said screen in laterally reversed relationship with respect to said first image, an index on said casing radially aligned with the center line of said screen, and a stationary scale cooperating with said index for indicating the drift of the aircraft.

MORTIMER L. CLOPTON.

REFERENCES CITED

The following references are of record in the file of this patent:

UNITED STATES PATENTS

| Number | Name | Date |
| --- | --- | --- |
| 1,531,693 | Douglass | Mar. 31, 1925 |
| 1,745,933 | Kauch et al. | Feb. 4, 1930 |
| 1,755,036 | Sussman | Apr. 15, 1930 |
| 2,194,059 | Valentine | Mar. 19, 1940 |
| 2,418,264 | James et al. | Apr. 1, 1947 |